Nov. 27, 1951 F. H. BRAY ET AL 2,576,097

AUTOMATIC TELEPHONE SELECTIVE SWITCHING SYSTEM

Filed Oct. 22, 1946 4 Sheets-Sheet 1

Inventors
Frederick Harry Bray
Leslie Ronald Brown
Desmond Sydney Ridler
By
Robert Harding Jr.
Attorney Nov. 27, 1951 F. H. BRAY ET AL 2,576,097

AUTOMATIC TELEPHONE SELECTIVE SWITCHING SYSTEM

Filed Oct. 22, 1946 4 Sheets-Sheet 2

Inventors
Frederick Harry Bray
Leslie Ronald Brown
Desmond Sydney Ridler
By Robert Harding Jr.
Attorney Inventors
Frederick Harry Bray
Leslie Ronald Brown
Desmond Sydney Ridler
By Robert Harding Jr.
Attorney Nov. 27, 1951 F. H. BRAY ET AL 2,576,097

AUTOMATIC TELEPHONE SELECTIVE SWITCHING SYSTEM

Filed Oct. 22, 1946 4 Sheets-Sheet 4

Inventors
Frederick Harry Bray
Leslie Ronald Brown
Desmond Sydney Ridler
By Robert Harding Jr.
Attorney Patented Nov. 27, 1951 2,576,097

UNITED STATES PATENT OFFICE 2,576,097

AUTOMATIC TELEPHONE SELECTIVE SWITCHING SYSTEM

Frederick Harry Bray, Leslie Ronald Brown, and Desmond Sydney Ridler, London, England, assignors to International Standard Electric Corporation, New York, N. Y.

Application October 22, 1946, Serial No. 704,840
In Great Britain July 23, 1945

Section 1, Public Law 690, August 8, 1946
Patent expires July 23, 1965

7 Claims. (Cl. 179—18)

This invention relates to automatic or semi-automatic telecommunication exchange systems.

According to one feature of the present invention an automatic or semi-automatic telecommunication exchange system comprises a selector switch, means for sending impulses to the magnet of said switch to cause the wipers thereof to be positioned on terminals of a wanted line, and means for connecting one electrode of a cold cathode discharge tube to a test terminal of said line for the purpose of testing the busy or idle condition of said line and for connecting such potential to another electrode of said tube that the tube will ignite if the line be free and fail to ignite if the line be busy.

Preferably there is such low resistance between and electrode of said tube and the test terminal of said line that upon the ignition of the tube the potential of said terminal is decreased to such an extent that no other similar tube connected to such potential will ignite. If this be the case the tested line will be busied immediately the tube ignites and the period of time during which a double seizure of the line might take place is reduced to the time required for the tube to ignite, which is very much less than the time required for the operation of a relay.

The testing arrangements set out above are of particular value when used in systems in which there are no individual line or cut-off relays associated with a subscriber's line, common equipment being provided for a group of lines, which equipment causes a calling line to be extended to a circuit which can respond to impulses to extend the connection further. In such systems leakage between different lines is liable to take place and accordingly the potential on the test conductor of a line which characterises its free or busy condition is liable to vary within wide limits. By means of the present invention an arrangement is provided by which the busy or idle condition of a line is determined with certainty despite the above mentioned variations. In systems such as those described in United States Patent No. 2,295,032 and in the United States applications, Serial No. 541,786, now Patent No. 2,502,415, granted April 4, 1950, and Serial No. 615,418, now abandoned, in which potential is connected to the test terminal of a line over a high impedance, the present invention provides an arrangement which is almost essential, since there would be considerable difficulties in securing operation of an electromagnetic relay used for testing purposes over a high impedance.

The cold cathode tube of the present invention may be used, in addition to its primary purpose, as an element of a relaxation oscillator for generating tones commonly used in a telephone system. Thus, it may be used to generate ring back tone, number unobtainable tone, busy tone and dialling tones.

In United States Patent No. 2,295,032, and in the United States applications, Serial No. 541,786 and Serial No. 615,418, there are described arrangements in which a first resistance is permanently conducted between one wire of the line and a common battery, a second and a third resistance are connected in series between the other wire of the line and a common starting means for a line finder, the test terminal of the line in the line finder being connected to the junction point of said second and third resistances. In order to provide for satisfactory operation both of the testing arrangement for a calling line and a testing arrangement for a wanted line in such systems, the present invention provides a modification of the above-mentioned arrangement in which an additional terminal is provided for each line, said additional terminal being connected to the said other wire of the line through a high resistance and being used as the test terminal for a wanted line.

The invention will be described further as embodied in the circuits for a private automatic exchange shown in the accompanying drawings in which.

LINE CIRCUIT

This line circuit is similar to that shown in United States Patent No. 2,295,032, and in the United States applications, Serial No. 541,786 and Serial No. 615,418, but modified according to the present invention. Negative battery of 50 volts is connected to one wire of the line over a resistance YLA of 10,000 ohms. Instead of the negative wire being connected to the common start circuit as shown in the above mentioned specifications, the positive wire is connected thereto over resistances YLB and YLC each of 10,000 ohms, the test terminal in the line finders being connected to the junction of resistances YLB and YLC. The positive wire of the line is connected over resistance YLD of 500,000 ohms to the terminals in the selectors over which the busy or idle condition of a line is determined.

LINE FINDER AND ALLOTTER CIRCUITS

Figure 1:
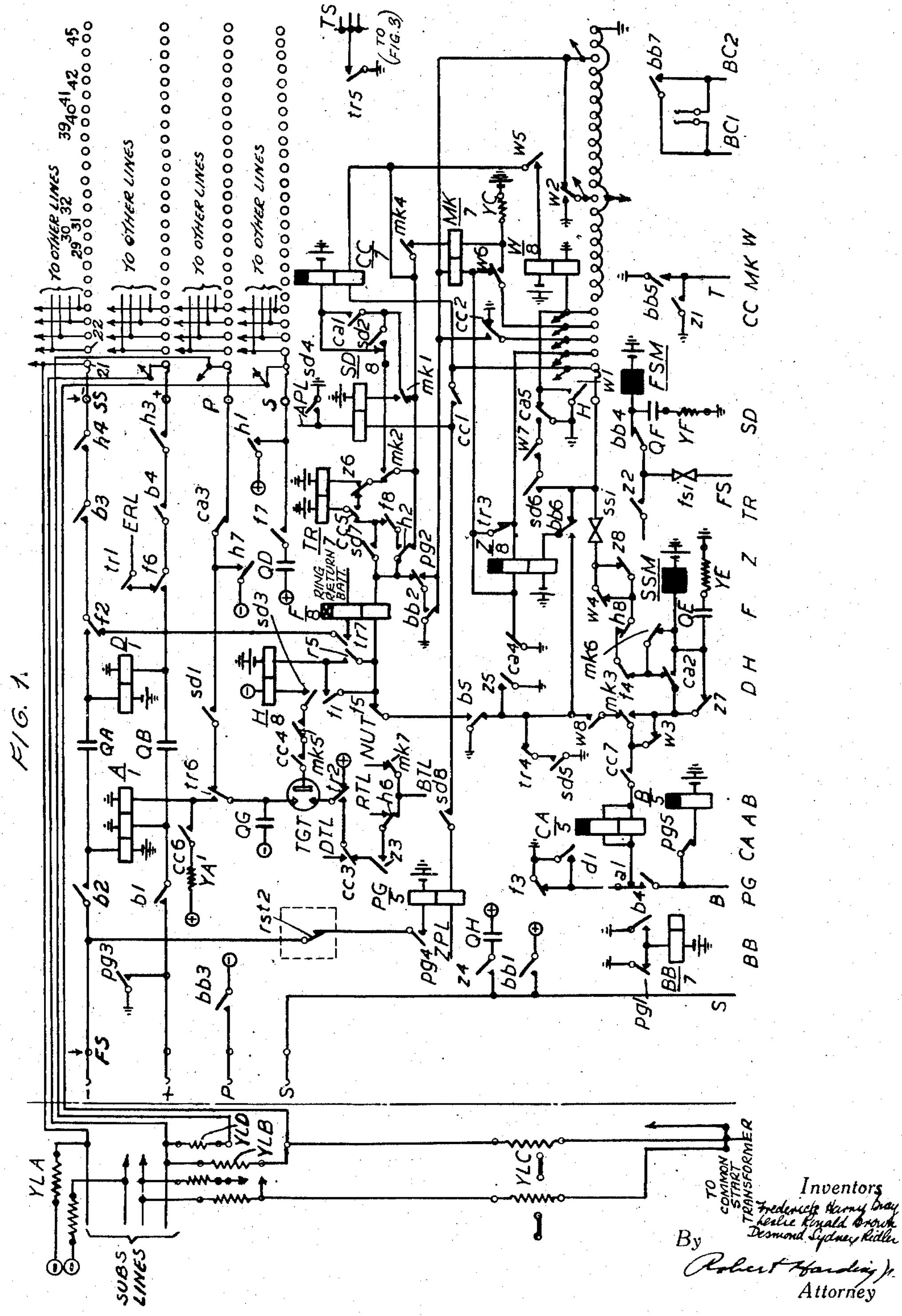
Fig. 1 shows a subscriber's line circuit and a link circuit; there are assumed to be four such link circuits serving 25 line circuits. This link circuit comprises a line finder switch FS and a selector switch SS.
Figure 2:
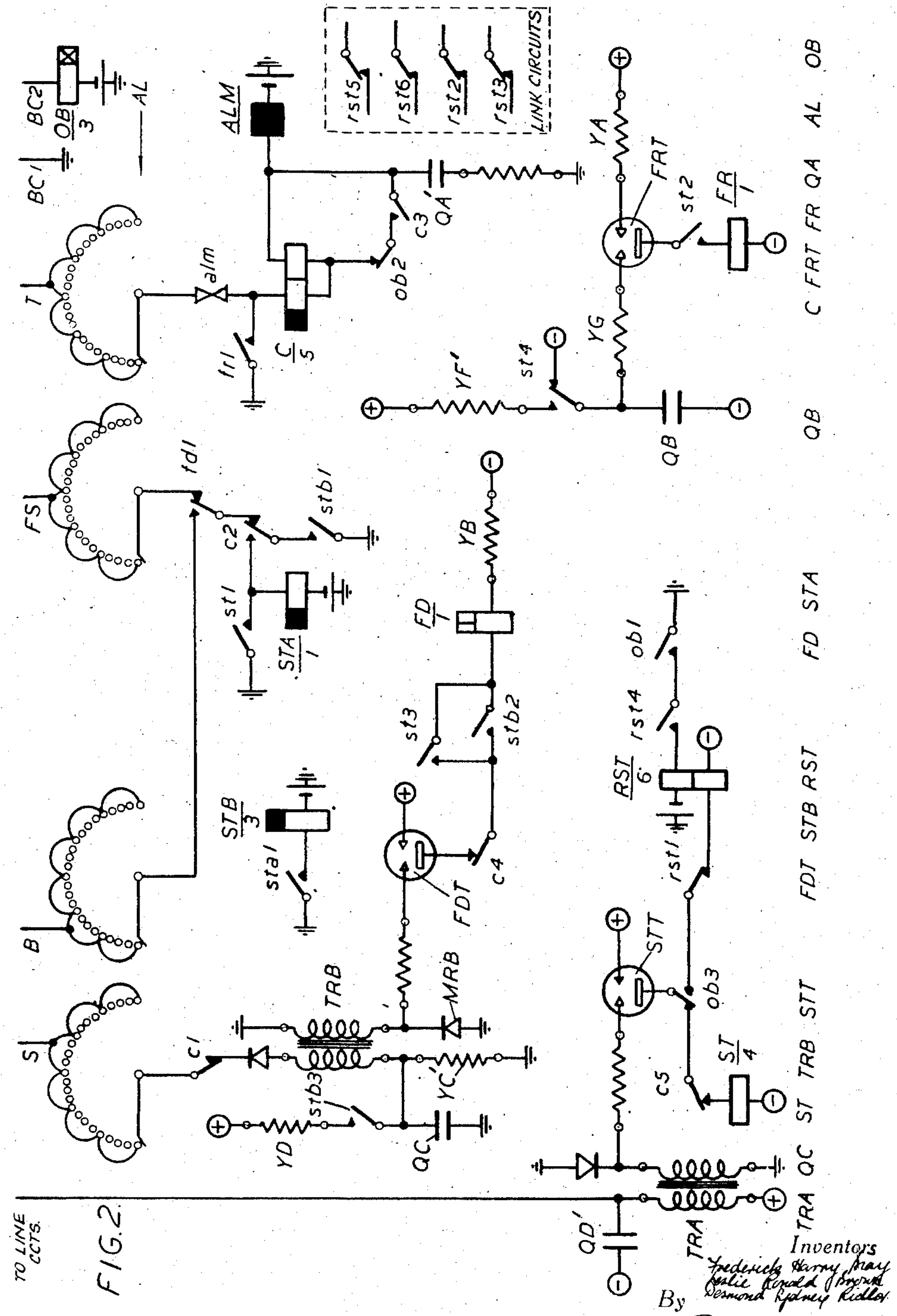
Fig. 2 shows an allotter circuit common to the four link circuits and a common start circuit for the line finders.

The circuits for the line finder FS (Fig. 1) and the allotter circuit Fig. 2 are generally similar to those described in the United States applications, Serial No. 541,786 and Serial No. 615,418, although modified slightly in accordance with the present invention. Each line finder FS is provided with four wipers —, +, P and S and with four terminals per line. The link circuit is connected over wires S, B, FS and T to terminals individual thereto on the allotter switch AL (Fig. 2). Wires BC1 and BC2, Fig. 1 are connected in a chain circuit extending from earth on wire BC1, Fig. 2 through each link circuit in series to wire BC2, Fig. 2.

DETAILED DESCRIPTION

*Subscriber calls*

When a subscriber makes a call the consequent flow of current in the primary of transformer TRA causes a cold cathode discharge tube STT to ignite and operate relay ST, in the manner described in the United States applications, Serial No. 541,786 and Serial No. 615,418.

(Transformer TRA is shunted on its primary winding by a small condenser QD′ of 0.005 mf. in order that any interference between subscriber lines, which must be of a moderately high frequency, shall be by-passed through the condenser and, therefore, have no effect on the start circuit.)

Relay ST at *st*2 up closes the main gap circuit of the cold cathode discharge tube FRT, over relay FR, at *st*3 up closes the main gap circuit of the cold cathode discharge tube FDT over relay FD, at *st*1 up operates relay STA, and at *st*4 up removes a short circuit on condenser QB and connects it in a charging circuit over resistance YF′. Relay STA at *sta*1 operates relay STB. At *stb*1 a circuit is closed for finder switch magnet FSM from earth, *stb*1 up, *c*2, *fd*1, allotter switch, wire FS, interrupter contacts *fsi*, *bb*4, FSM battery. At *stb*2 the main gap circuit of cold cathode tube FDT is confirmed, and at *stb*3 a potentiometer consisting of resistances YD and YC′ is connected across the 50 volt exchange battery.

When a subscriber's line is open there is a positive potential on the S lead; this potential should have a value of 50 volts derived over the primary of TRA, but will fall short of this value if the open circuit resistance of the subscriber's loop is less than infinite; thus with a subscriber's line having a leak resistance of 10,000 ohms the potential on the S lead will be reduced to 25 volts positive. On the other hand, when the subscriber's line is closed this calling condition is indicated by a potential on the S lead of about 17 volts positive. The potential applied to the terminal of the primary of transformer TRB by means of the potentiometer YD, YC′ is accordingly 25 volts positive in order that no current shall flow from leaky lines. The condenser QC is provided so that the change of potential applied to the primary of transformer TRB shall not be sudden, but spread over a period of about 5 milliseconds. If the change be sudden the self-capacity of the transformer TRB may cause a sufficient change in the potential across the secondary thereof to ignite tube FDT. The line finder wipers are stepped to search for the calling line and when the line is found the tube FDT ignites and high speed relay FD operates, opening at *fd*1 the circuit for the magnet FSM, and applying earth over wire B to operate relay B in Fig. 1. Relay B operates and at contacts *b*4 operates relay BB, which at contacts *bb*5 places earth on the T lead to the allotter circuit (Fig. 2) which is extended over interrupter contacts *alm* of the allotter switch magnet ALM, both windings of C to magnet ALM and battery. Relay C operates and at contacts *c*3 short circuits its high resistance winding whereupon the magnet ALM is operated and steps its wipers until a free link is found by the absence of earth on the T wire. Relay C remains operated whilst the allotter switch is stepping, after which it releases slowly. At contacts *c*5 and *c*4, relay C opens the main gap circuits of the tubes STT and FDT respectively so that relays ST and FD release, whilst relay C remains operated, relay STA is kept operated over *c*2 up and *stb*1 up, but when relay C releases, STA releases slowly followed by STB which also releases slowly.

During the release time of these two relays the FS switch associated with the now free link circuit is stepped round in search of a possible calling subscriber. On the release of relays STA and STB the allotter circuit is again normal.

*All link circuits busy*

Should all the link circuits be busy, relay OB operates in a chain circuit over contacts *bb*7 in all the link circuits. At contacts *ob*3 relay ST is disconnected from the anode of the start tube STT and connects it instead to relay RST for a purpose to be described later.

At *ob*2 the relay C is prevented from short circuiting its high resistance winding so that magnet ALM cannot operate. If subsequently any link circuit should cease to be busy, relay OB releases and ALM is able to operate to step its wipers to connect with that link circuit.

*Forced release*

If a call is originated but the subscriber clears before the calling line is found, or the origination of the call be due to a faulty line, relay ST will operate and the wipers of FS will be stepped in search of the calling line. Since there is no calling line, relay FD will not be operated. After an interval condenser QB will be charged up to such potential that a cold cathode discharge tube FRT ignites. Relay FR operates and at *fr*1 up operates relay C and magnet ALM operates. At contacts *c*2 a locking circuit is closed for STA, at contacts *c*5, the circuit of ST is broken. At contacts *st*2 the circuit of FR is broken. This relay releases, releases relay C and magnet ALM, the wipers of which take one step, STA and STB release in turn.

*Link circuit prepares for dialling*

As stated above, when the calling line is found, relays B and BB are operated. At contacts *b*1 and *b*2 the calling line is extended to relay A, which operates. At *bb*1 a potential of +50 volts is applied to the subscriber's S lead which prevents the line being subsequently taken as a calling line; at contacts bb3 a busy potential of −50 volts is applied to the P lead; at bb4 the circuit of FSM is broken. At bb2 the following circuit is closed: earth, bb2 up, pg2, h2, lower winding CC, home contact and wiper of bank H of SS, interrupter contacts ssi, w4, and z3 in parallel, h8, f4, mk6, SSM, battery. Relay CC operates but SSM does not operate in this circuit.

At cc1 a circuit is prepared for the left hand winding of SD. At cc6 a positive potential of 100 volts is connected to the right hand winding of relay A through resistance YA', of a value such that the flux produced by this winding very nearly counter balances the flux in the other two windings in order to give an improved performance of relay A during impulsing. At cc7 up a circuit is prepared for the operation of relay CA during impulsing.

Relay TR is operated over the following circuit: earth, bb2 up, pg2, h2, mk2, z6, cc5 up, left hand winding TR, battery. Relay TR applies earth over tr5 up to lead TS to the circuit of Fig. 3 for a purpose to be explained later. At tr6 one side of the control gap of the cold cathode discharge tube TGT is connected to the right hand winding of relay A and at tr2 up, cc3 up the other side of this control gap is connected to the lead marked DTL which is connected in Fig. 3 to a condenser and resistance combination. The tube TGT operates as a relaxation oscillator in known manner to generate dial tone which is received by the subscriber.

The link circuit is now ready to receive the first digit. The subscribers are numbered 21 . . . 30, 31 . . . 40 and 41 . . . 45, the sets of contacts on the SS switch connected to the various subscribers being indicated by the numbering on the upper set of terminals shown in Fig. 1.

*Subscriber dials 1 as first digit*

On the first break impulse, relay A releases, and at a1, magnet SSM is energised in series with relay CA which operates, battery, SSM, mk6, ca2, w3, cc7 up, lower winding CA, a1, f3, ground, completes the above circuit independently of mk6 at ca2 up and provides a holding circuit for relay CC over the upper winding thereof, contacts ca1, mk1, h2, pg2, bb2, to ground.

On the re-operation of relay A at the end of the break impulse the magnet SSM is released and the SS switch steps on to the first set of contacts. Relay CA will release slowly, followed later by relay CC. On the release of relay CA relay Z will operate from the earth at ca4 over its upper winding in series with the H contact of the SS switch and magnet SSM.

Relay Z operating completes a circuit at z5 to hold relay TR operated over its right hand winding when relay CC releases, and over tr2 up, cc3 back, z3 up, h5, mk7 a condenser resistance network is connected to the control gap of the cold cathode tube TGT so that N. U. tone is generated in the tone winding of relay A.

On the release of relay CC, the operating circuit for relay CA is disconnected at cc7, so that further impulsing has no effect on the link circuit.

*Release of call*

On release of this call, relay A releases followed by relay B, which disconnects the A relay from the subscribers' line, so that during the slow release time of relay BB following after relay B, the condenser in the subscribers' bell set can be charged to the positive and negative 50 volts of the positive and negative lines. In this way, the charging current of the condenser is not drawn through the start transformer TRA with the possibility of creating false start conditions.

Relay BB releasing releases relay TR, and also closes a circuit for SSM over its interruptor contacts bb6, lower winding of Z to ground and the SS switch runs to its home position, relay Z remaining operated through contact bb8 so long as the switch is off normal. Over the third contact of the H bank its circuit is over cc2; over the fourth contact its circuit is over w6 and ca4; over the fifth contact its circuit is over ca5; over contacts 13 and 23 its circuit is over bb2.

With relay Z operated and relay BB released a 2 mf., condenser QH is applied to the "S" lead of the finder switch FS, so that any leak resistance across the subscribers' line, will not cause a sudden D. C. flow in the primary of TRA, but will allow the D. C. to build up gradually, as condenser QH becomes charged. Again in this way the possibility of false starts is overcome.

When the SS switch reaches its home contact, relay Z releases, disconnecting QH from the S lead, and the busying earth from the T lead, so that the link is now free to the allotter for further calls.

*Subscriber dials 2 as first digit*

On the first break impulse, relay A releases and operates relay CA, which remains operated during the two impulses. The SS switch steps to its contacts 3, and on the release of relay CA, relay MK is operated ground ca4 back, left hand winding MK, cc2 up, contact 3 of bank H of SS, ssi, w4, h8, f4, mk6, SSM and battery. Relay MK operating holds (at mk2) relay CC operated and releases relay TR. Relay TR releasing disconnects dial tone from the calling subscriber.

The circuit is now ready to receive the second digit.

*Subscriber dials 3 as first digit*

Similar sequence as subscriber dialling 2 for first digit, until the end of dialling when relay CA releases with the SS switch on contacts No. 4. Relay CA releasing, connects an earth to contact 4 of the H bank of the SS switch through ca4 and w6 so that the SS switch steps on. Contact 5 of the H bank is also earthed by ca5 and contacts 6 to 12 are also earthed, so that the SS switch steps to contacts No. 13. When the SS switch reaches these contacts, relay MK operates in series with SSM over w2 back, left hand winding of MK, ca4, earth.

Relay MK operating, at its contacts mk2 reoperates relay CC, which released whilst the switch was stepping and releases TR. Dial tone is disconnected from the calling subscriber.

Relay CC operating prepares a circuit for relay CA and the SS magnet, so that the circuit is ready to receive the second digit.

*Subscriber dials 4 as first digit*

Similar to above, up till the end of the 4th impulse when the SS switch steps on to contacts No. 5. Relay W operates over contact 5 of the H bank in series with SSM, locking over its upper winding through w5 up. At contacts w1 up a direct earth is connected to contact 5 of the H bank, so that the SS switch steps to contacts No. 13. The contact of the H bank is earthed at w2 up so that the switch steps to contacts No. 23.

Whilst the switch is stepping, relay CA releases so that when the switch reaches contacts No. 23, relay MK operates, and re-operates relay CC if it has already released.

The circuit is now ready to receive the second digit.

*Subscriber dials 5, 6, 7, 8, 9 or 0 as first digit*

Similar sequence as above up to the end of the 4th impulse, when W relay operates and irrespective of the number of further impulses causes the SS switch to start to step onwards.

Relay W operating breaks the impulsing circuit to the SS switch at *w3* and connects any further impulses to the Z relay through *w8* and *bb6*. On receiving the 5th impulse, relay Z operates and breaks the stepping circuit of the SS switch at *z8* so that it does not reach contacts 23. Contacts *z6* operate relay TR, and N. U. Tone is connected to the calling subscriber, when relay CC releases due to the release of relay CA.

Relay MK cannot operate so that relay CC cannot be re-operated. Any further impulse therefore is not effective.

*Subscriber fails to dial*

If the subscriber fails to dial, on application of an "A" pulse (earth) to lead APL relay SD operates through *cc1*, locks on its operating winding at *sd4* in series with SSM, and prepares an operating circuit for the pulse winding of relay PG. (The circuit for generating these pulses is described hereinafter.)

After a further 30 seconds earth constituting the "Z" pulse is applied to lead ZPL and operates relay PG through *sd8* and *cc1*, which at *pg5* releases relay B and at *pg1* holds relay BB operated. Relays CC and TR are released at *pg2*. When relay B releases, relay A is released and relay Z operates over *bb6* up, *b5*, earth.

At *pg3* earth is connected to the + wire of the subscriber's loop and at *pg4* relay PG holds to this earth over the subscriber's loop. The circuit is thus left in a busy condition only relays PG, BB and Z remaining operated.

If the subscriber clears, then PG releases, followed by relay BB. FSM is operated over *bb4*, *z2* up earth, Z releases after an interval and breaks the circuit of FSM. Switch FS makes one step. The releasing sequence of PG, BB and Z is the same as B, BB and Z under normal clear down conditions in order to avoid false starts of the allotter circuit.

If, however, this link is held by the subscriber and all the other links are also busy, relay RST is connected in the anode circuit of the tube STT (Fig. 2) as previously described. If now a further subscriber makes a call relay RST operates and locks over *rst4* up *ob1* up. Contacts *rst1* disconnect RST from the tube STT. Contacts *rst3*, *rst2*, *rst5* and *rst6* are situated in the various link circuits in the position illustrated by *rst2* in Fig. 1. Relay PG is disconnected from the subscriber's loop in which it was held and releases, followed by BB and Z as above. The FS switch makes one step during the release time of relay Z.

This link circuit is then free, and is allotted to the newly calling subscriber.

The FS switch is made to take one step so that it finds the new calling subscriber and does not immediately find the subscriber who has previously been holding the link circuit.

*Subscriber dials 2nd digit*

Assuming that the subscriber's first digit was either 2, 3, or 4, then the subsequent impulses step the SS switch to the desired number in the 20, 30 or 40 groups.

At the commencement of the second set of impulses relay CA operates in series with the SSM and since MK is now operated; SD operates over *mk1* up, *ca1* up, *sd2*, *mk2* up, *h2*, *pg2*, *bb2* up, earth. Relay SD holds over *sd2* up independently of relay CA, disconnects the holding circuit of relay CC through *mk2*, and leaves relay CC under the control of relay CA.

At the end of impulsing, relay CA releases and with relay TR released and relay SD operated the control gap of the cold cathode tube is connected to the P lead of the called subscriber's line circuit. Relay Z operates over *bb6* up, *tr4*, *sd5* up, earth, and locks to *z5* up and earth.

*Subscriber dials 6 or more as 2nd digit following 4 as first digit*

If the subscriber dialled 4 as first digit, switch SS is on the 23rd set of contacts as described above. If now six or more impulses are sent for the second digit, the wipers of switch SS are stepped by the sixth impulse on to the fourth set of contacts, and with contacts *w6* up, the relay MK is short circuited by earth connected over *ca5* up, *w7* up, *sd6* up, H wiper of SS switch, *w6* up. MK releases and at *mk3* opens the impulsing circuit for magnet SSM, so that further impulses have no effect. Relay TR operates over *z6* up, *mk2*, *h2*, *pg2*, *bb2* up, earth. When impulsing ends and CA and CC release, the NUT lead is connected over *mk7*, *h6*, *z3* up, *cc3*, *tr2* up to the tube TGT and number unobtainable tone is given to the calling subscriber.

*Called subscriber busy*

Assuming the subscriber has dialled correctly but the called subscriber is busy, the potential on the P lead of the called subscriber will be either negative 50 volts or negative 17 volts according to whether this subscriber had been found by a link circuit or whether this subscriber had originated a call and is in process of being found by a line finder.

One electrode of the control gap of tube TGT is connected to the P wiper of switch SS over *tr6* back, *sd1* up, *ca3* and if either of the above mentioned potentials is on the P terminal, the tube TGT will not ignite.

Relay CC will release having been released by relay CA and relay TR will be operated at *cc5* and *sd7*. On the operation of relay TR and with relay MK still operated, a resistance-condenser network is connected from the lead BTL to the cold cathode tube from the ringing and tones circuit over *h6*, *z3* up, *cc3*, *tr2* up, and Busy Tone is generated in the tone winding of the A relay by the cold cathode tube.

*Called subscriber free*

If the called subscriber is free then the potential on P lead of the line circuit will be between 50 and 25 volts positive, according to the leak resistance of the called subscriber's positive and negative lines. This voltage together with the negative 50 volts on the other side of the cold cathode tube is sufficient to ignite the tube, and operate relay H'.

The voltage on the called subscriber's "P" lead will decrease to approximately only positive 5 volts immediately the tube ignites (and before the operation of relay H') due to the sustaining voltage of the cold cathode tube being of the order of 55 volts. This positive 5 volts will test busy to any other link which may be testing; so that the period during which two links can test on to the same subscriber's line is limited to approximately 100 micro-seconds (the striking time of a cold cathode tube).

Relay H' operating connects negative 50 volts to the called subscriber's "P" lead, at *h7* up so that on the subsequent release of relay SD and the extinguishing of the cold cathode tube, the called subscriber's "P" lead will be maintained busy. Relay H' locks over *h5* up, *f5*, *b5* up, earth.

At *h2* relays SD and MK (and W if operated), are released and relay TR is operated through *f8*.

With relays TR, H' and Z operated Ring Tone is generated in the tone winding of the A relay by the cold cathode tube.

Relay TR re-starts the ringing and tones circuit at *tr5* up and connects ringing current to the called subscriber's bell at *tr1* up and *tr7* up, over *h3* and *h4* up, and *b3*, *b4* up.

*Called party answers*

When the called party answers, a D. C. loop is placed across the positive and negative lines and the ringing trip-relay F is operated, locking on its second winding in series with relay H' due to the removal of the short circuit by its "X" contact *f5*.

Relay F operating switches the called subscriber's lines through to the feed relay D at *f2* and *f6*, releases relay TR at *f8* and disconnects the holding circuit for relay B. The holding circuit of relay B is then again completed on the operation of relay D.

Relay TR releasing disconnects ring tone from the calling subscriber and removes the earth from the Tone Start.

*Clear down from answered call*

On clearing, relay A or relay D releases followed by relays B and BB.

Relay BB releasing releases relays TR, SD, MK, (W if operated) and relay H' followed slowly by F at *bb2*.

The called subscriber's positive, negative and "P" leads are released in the same sequence as those of the calling subscriber. Relay B disconnects the D relay from the called subscriber at *b3* and *b4* and during the slow release of relay BB the condenser in the subscriber's bell set is allowed to charge to the positive and negative 50 volts of the subscriber's line due to a potential of positive 50 volts being maintained on the "S" lead at *h1*. On the release of relay H', relay F is released slowly and during this slow release of relay F, condenser QD is connected to the "S" lead of the called subscriber, and serves the purpose of sterilising the start circuit of the called subscriber in a similar manner to contact *z4* and QH on the calling subscriber's "S" lead. On the release of relay F, the SS switch is allowed to home and relay Z releases when the SS switch arrives on its home contact.

On the release of relay Z, the link circuit becomes free, and the FS switch makes one step at contact *z2*.

*Clear down from busy call*

Clearing from this call is similar to that described for clear down from a call receiving N. U. Tone with the exception that in this case MK is operated. Relay MK is released by relay BB.

*Clear down from unanswered call*

On release of relay A relay B releases and during the slow release of relay BB relay F is operated due to the removal of the short circuit across its winding at B5.

After the operation of relay F, clear down is similar to that for an answered call.

*Time pulse, ringing and tones circuit (Figs. 3 and 4)*

Figure 3:
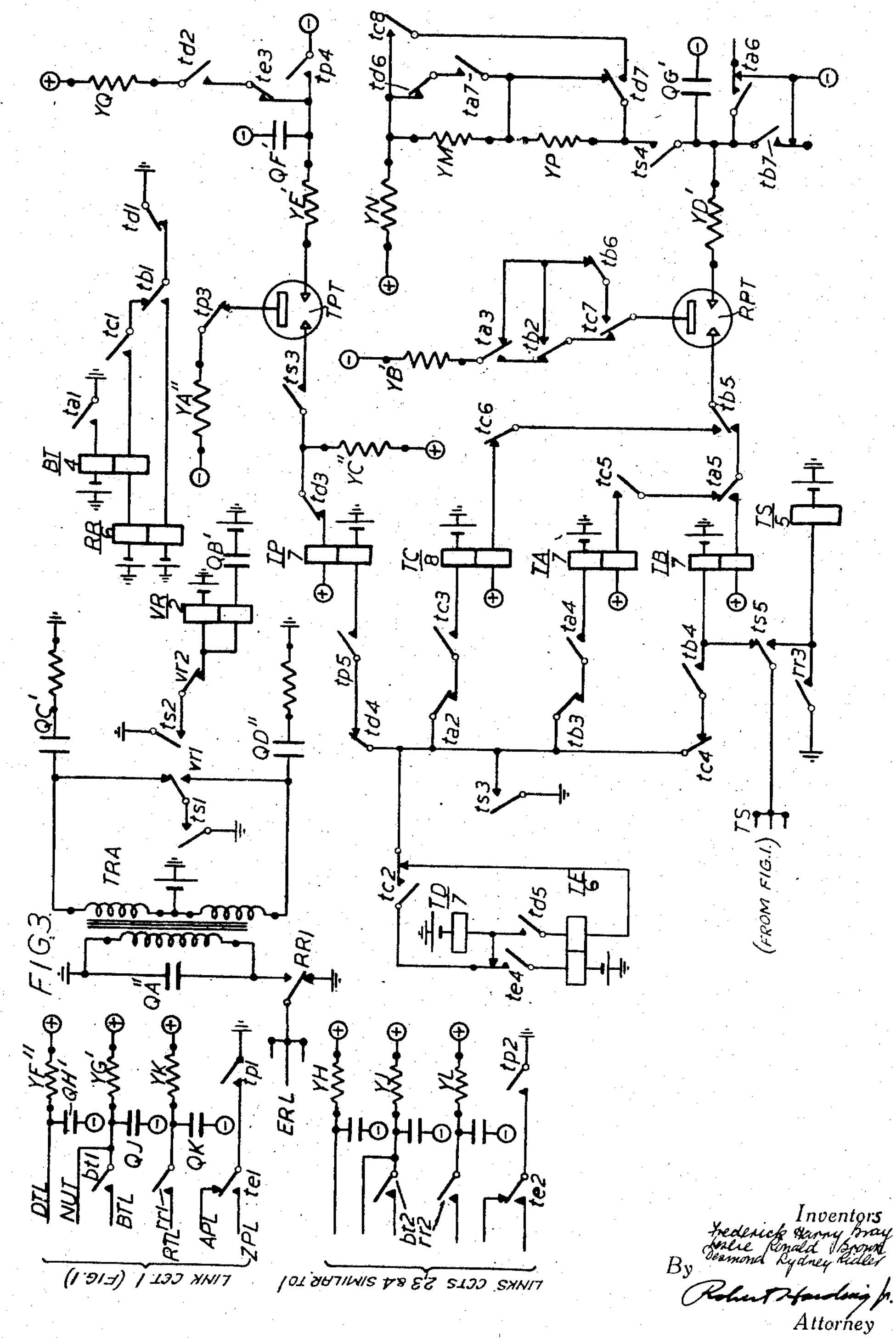
Fig. 3 shows a time pulse circuit common to the four link circuits together with two tone generating circuits, each individual to one of the link circuits. The other two tone generating circuits are not shown but are similar to the two shown.
Figure 4:
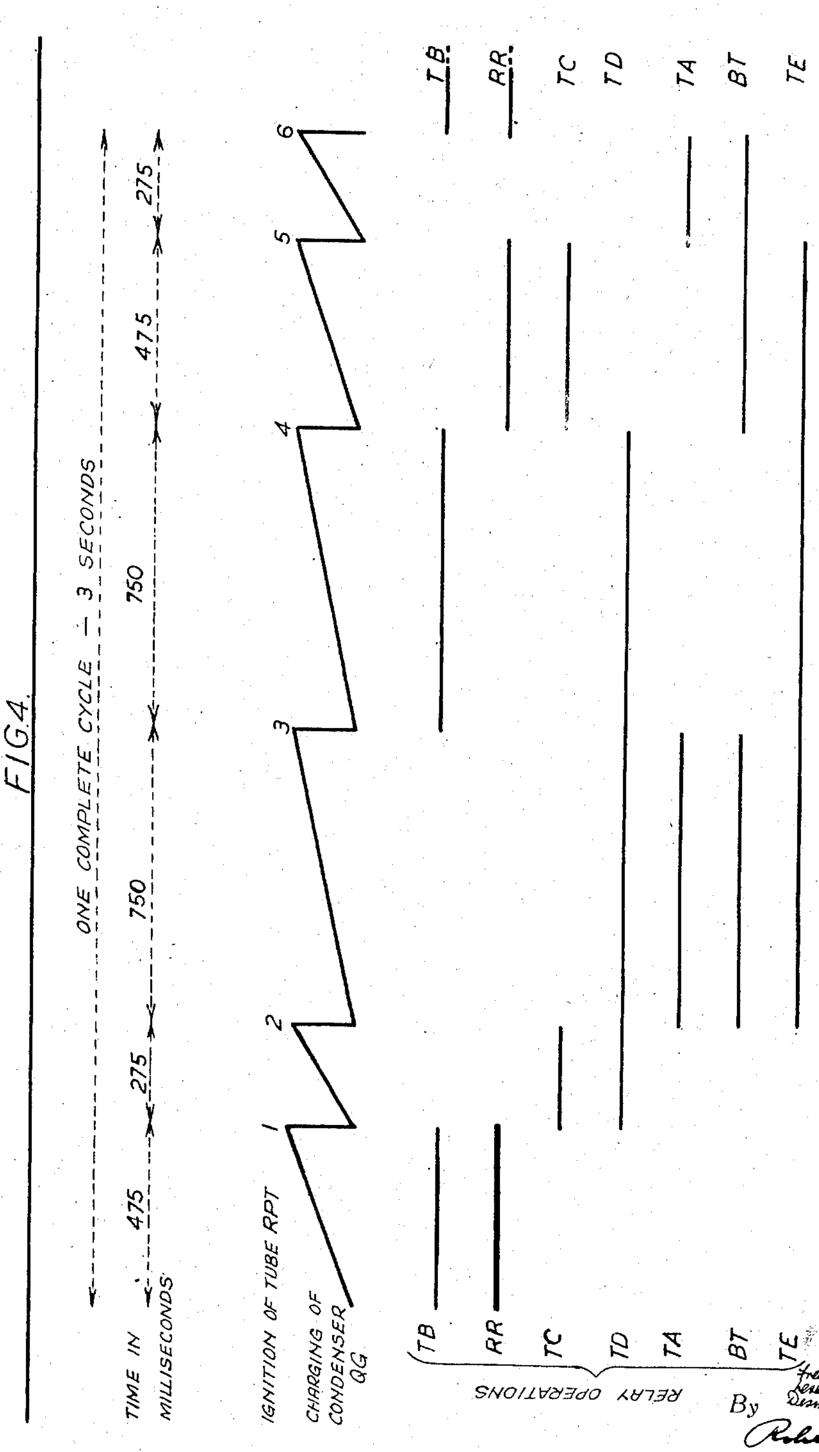
Fig. 4 shows by means of a time chart the cyclic operation of the circuit shown in Fig. 3.

The circuit shown in Fig. 3 generates the tones and pulses required in the exchange system being described. As previously stated there is a tone generating circuit individual to each link circuit, two only of the former being shown, of which the one in the upper left hand corner of Fig. 3 is individual to the link circuit of Fig. 1. Each tone circuit consists of a condenser and resistance and when the appropriate lead is connected to the tube TGT in Fig. 1, the resulting circuit is a relaxation oscillator of the frequency required to give the desired tone. Thus resistance YF' and condenser QH' function with tube TGT when connected thereto over lead DTL to generate dial tone. Resistance YG' and condenser QJ function with tube TGT when connected thereto over lead NUT or lead BTL to generate the higher frequency characteristic of number-unobtainable or busy tone. The difference between these two tones is that number-unobtainable tone is continuous whilst busy tone is interrupted by the opening and closing of contacts *bt1*. Resistance YK and condenser QK operate when connected over lead RTL to tube TGT to generate ringing tone.

The remainder of the circuit of Fig. 3 acts to cause the proper sequence of operations of contacts $bt_1$ to give the interruptions of tone characteristic of busy tone, the operations of contacts *rr1* to give the interruptions of tone characteristic of ringing tone, and the operations of contacts *tp1* and *te1* to give the "A" and "Z" pulses to leads APL and ZPL.

The interruptions characteristic of ringing tone and busy tone given by the circuit of Fig. 3 differ slightly from those adopted by the British Post Office in order that one sequence of operations may suffice for both sets of interruptions. Accordingly the busy tone used is 0.75 second on and 0.75 second off, a complete cycle occupying 1.5 seconds, whilst ringing tone is taken as 0.475 second on, 0.275 second off, 0.475 second on, 1.775 seconds off, the total cycle thus occupying 3 seconds.

The relays TA, TB, TC, TD, TE, BT and RR in Fig. 3 co-operate in a cyclic operation of 3 seconds giving in that period one complete cycle of ringing tone and two cycles of busy tone. For this purpose condenser QG' is repeatedly charged to a voltage sufficient to ignite the cold cathode discharge tube RPT, and the respective times of charging this condenser vary throughout a cycle of operation in a manner which is explained below and is illustrated by means of the time chart of Fig. 4. The charging circuit of QG' is taken over resistors YN, YM, YP of which YP above, or YP together with YM can be cut out to vary the charging time. The following table gives the various times in milliseconds:

| In circuit— | Time |
|---|---|
| YN, YM and YP | 950 |
| YN and YM | 475 |
| YN | 275 |

The instaneous discharge of QG' occurs whenever relay TA or TB changes over the condition of its contact sets *ta6* or *tb7* due to the momentary connection together of all contacts in these sets.

The cycle starts when an earth on the lead TS operates relay TB which at *tb1* operates relay RR. Relay RR operates relay TS at *rr3* which leaves relay TS under the control of the earth on the Tone Start lead over *ts5*.

Relay TS operating, at *ts1* prepares a circuit for producing ringing in transformer TRA by D. C. reversals in the primary when relay VR vibrates. At *ts2*, relay VR is energized through *vr2* so that it vibrates at about 16 I. P. S. (controlled by the value of QB').

Contact *ts3* prepares a main locking earth from the counting train relays, and contact *ts4* completes a charging circuit for condenser QG'.

With TS operated the original operating circuit for relay TB is broken, but relay TB holds over its "X" contact *tb4*. At *tb1* relay RR is held operated.

The cyclic operation may conveniently be set out in tabular form, starting at the beginning again with the operation of relays TB and RR:

TB operates: as above, or in later cycles from tube RPT.
RR operates: *td1*, *tb1* up.
QG' charges in 475 ms.: YN, YM, *td7*, *ts4* up.

1

Tube RPT ignites:
TC operates: +, YB, *ta3*, *tb2* up, *tc7*, tube RPT, *tb5* up, *tc6*, TC, —
And locks: *ts3* up, *ta2*, *tc3* up.
Tube RPT quenches: *tc6* up, *tc7* up.
TD operates: *ts3* up, *tc2* up, *te4*.
RR releases: *td1* up.
TB releases: *tc4* up.
QG discharges: on the bunching of *tb7* releasing
QG charges in 275 ms.: YN, *tc8* up, *td7* up, *ts4* up.

2

Tube RPT strikes.
TA operates: *tb5*, *ta5*, *tc5* up.
And locks: *ts3* up, *tb3*, *ta4* up.
Tube RPT quenches.
QG' discharges: on the bunching of *ta6* operating.
BT operates: *ta1* up
TC releases: *ta2* up.
TE operates: *ts3* up, *tc2*, TE, *td5* up, TD.
QG' charges in 750 ms.: YN, YM, YP, *ts4* up.

3

Tube RPT strikes.
TB operates: *tb5*, *ta5* up,
And locks: *ts3* up, *tc4*, *tb4* up.
QG' discharges: on bunching of *tb7* operating
Tube RPT quenches: *tb5* up, *tb2* up.
TA releases: *tb3* up.
BT releases: *ta1*.
QG' charges in 750 ms.: YN, YM, YP.

4

Tube RPT strikes.
TC operates: *tb5* up, *tc6*
And locks: *ts3* up, *ta2*, *tc3* up.
Tube RPT quenches: *tc6* up, *tc7* up.
TD releases: *tc2* up.
(But TE stays up: *tc2* up, *tc4* up.)
TB releases: *tc4* up.
QG' discharges: on bunching of *tb7* releasing
QG' charges in 475 ms.: YN, YM, *td7*.

5

Tube RPT strikes.
TA operates: *tb5*, *ta5*, *tc5* up
Tube RPT quenches:
TC releases: *ta2* up.
TE releases: *tc2*.
QG' discharges: on bunching of *ta6* operating
RR releases: *tc1*
(But BT remains up at *ta1* up.)
QG' charges in 275 ms.: YN, *td6*, *ta7* up, *td7*.

6

Tube RPT strikes:
TB operates: *tb5*, *ta5* up.
Tube RPT quenches: *tb5* up and *tb2* up.
QG' discharges: *tb7* up.
TA releases: *tb3* up.
BT releases: *ta1*.
RR operates: *ta1*, *tb1* up.

So long as the earth is maintained on the lead TS, this cycle is continuously repeated.

It can be seen from the chart (Fig. 4) that relay BT has a cycle of 1.5 seconds duration, the relay being operated for .75 second and released for .75 second; and that the cycle for RR commencing from the 4th ignition of tube RPT is of 3 seconds duration the relay being operated for .475 second, released for .275 second, operated for .475 second and then released for 1.775 seconds.

Contacts *bt1* and *rr1* connect the appropriate condenser resistance networks to leads BTL and RTL respectively.

During each complete cycle of the counting-train relays, a charging pulse of 275 milliseconds is connected to condenser QF': *te3*, *td2* up, YQ. Each pulse charges condenser QF' more positively, until after 30 seconds, on the operation of relay TD, the charge on condenser QF' is sufficient to strike the "Time Pulse" tube TPT. When relay TD releases, relay TP is connected through the tube resistance YA'' to +100 volts, operates and at *tp3* extinguishes the tube, but locks on a second winding to its "X" make at *tp5*. Relay TP operating discharges condenser QF' at *tp4*, and connects an earth to the "Z" pulse lead ZPL through the respective *be1* up.

The release of relay TD is followed by the release of relay TE after 275 milliseconds. Relay TE releasing disconnects the earth from the ZPL and connects it to APL. After 750 milliseconds, relay TD re-operates and releases relay TP at *td4*. Relay TP releasing disconnects the earth from the APL and removes the short circuit from condenser QF' so that after a further 30 seconds the "Time Pulse" tube will again strike.

On removing the earth from the lead TS, relay TS releases followed by any other relays that may be operated.

What is claimed is:

1. Automatic or semi-automatic telecommunication exchange system comprising a plurality of lines, a selector switch having a plurality of sets of terminals, cooperating wipers therefor, and actuating mechanism for said wipers, each of said lines being connected to a separate set of said terminals, one of said terminals in each set being a test terminal used for determining a busy or idle condition of said lines, a cold cathode discharge tube having at least three electrodes, a source of energizing potential having a first pole thereof connected to a first electrode of said tube, means for driving said actuating mechanism to cause said wipers to become positioned upon a set of terminals corresponding to a wanted one of said lines, means including a resistance and the test terminal of said wanted line for coupling another electrode of said tube to the second pole of said source, means including said resistance to apply a potential of predetermined polarity and value from said source to said test terminal according to the condition of said line, whereby to ignite said tube if said line be free, thereby decreasing the available potential on said test terminal because of the drop of potential through said resistance.

2. A telephone testing arrangement in an automatic or semi-automatic telecommunication exchange system comprising a plurality of subscriber's lines each having a first and a second conductor, a subscriber station connected to each line and including means for varying the conductance between said conductors of said line to initiate a call, a group of line finders each having a bank of terminals including test terminals, said lines terminating in the banks of said finders, a plurality of selector switches having banks of terminals including test terminals and wipers cooperating therewith, means controlled by a calling station through a line finder for selecting a set of terminals on a selector switch inincluding one of said selector switch test terminals, a source of two-pole potential common to said line, a first resistance for each line connected between one wire of that line and a first pole of said source, means common to said lines and controlled by said station for starting said finders, a second and a third resistance serially connected and disposed between the other wire on each line and the other pole of said source and including a portion of said starting means, means to connect the test terminals of said line finders, respectively, to the junction point of each of said second and third resisances, the test terminals of said selector switches being connected respectively to the test terminals on said finders, a testing means comprising a cold cathode discharge tube having a control electrode and another electrode, means for connecting said control electrode to the wiper cooperating with the test terminals of said selector switches for testing the busy or idle condition of a wanted line, means for connecting the other electrode of said discharge tube to the first pole of said source, and means controlled by said discharge tube for controlling said selecting means.

3. Automatic or semi-automatic telecommunication exchange system, as claimed in claim 2, further comprising a second cold cathode discharge tube having at least two electrodes, and in which the means for starting the finders includes a transformer having a primary winding and a secondary winding, the primary winding of said transformer being serially connected between said subscriber's lines and the second pole of said source in series with the second and third resistance, the secondary winding of said transformer being serially connected between earth and one electrode of said last-named discharge tube, means for connecting the other electrode of said tube to the first pole of said source, whereby said tube is adapted to ignite when a potential of predetermined polarity and value from said source appears on one of said lines, and means for extinguishing said tube in response to the operation of a line finder finding said line.

4. Automatic or semi-automatic telecommunication exchange system, as claimed in claim 3, in which the primary of said transformer and said source are shunted by a small condenser.

5. Automatic or semi-automatic telecommunication exchange system, as claimed in claim 2, in which the discharge tube has a third electrode, and further comprising a resistance and a condenser, and means for connecting said third electrode to the second pole of the source through said resistance and to the first pole of the source through said condenser, whereby said tube acts as a relaxation oscillator to generate a distinctive audible tone, said last mentioned connecting means being operative under control of said testing means.

6. Automatic or semi-automatic exchange system as claimed in claim 5, further comprising a relay having a first winding connected to a calling subscribed's line in a manner to cause said relay to respond to impulses consisting of line interruptions, and a further winding on said relay connected in circuit with a discharge gap of the cold cathode tube.

7. Automatic or semi-automatic exchange system as claimed in claim 6 comprising a plurality of selectors, and a circuit common thereto for generating closures and openings of the said relaxation oscillator circuit.

FREDERICK HARRY BRAY.
LESLIE RONALD BROWN.
DESMOND SYDNEY RIDLER.

REFERENCES CITED

The following references are of record in the file of this patent:

UNITED STATES PATENTS

| Number | Name | Date |
|---|---|---|
| 1,908,326 | Demarest | May 9, 1933 |
| 1,941,254 | Flad | Dec. 26, 1933 |
| 2,091,127 | Taylor | Aug. 24, 1937 |
| 2,245,160 | Schmipf | June 10, 1941 |
| 2,285,524 | Logan | June 9, 1942 |
| 2,291,036 | Hall | July 28, 1942 |
| 2,306,882 | Holden | Dec. 29, 1942 |
| 2,351,016 | Deakin | June 13, 1944 |
| 2,354,682 | Herbig | Aug. 1, 1944 |
| 2,423,087 | Vriendt | July 1, 1947 |
| 2,471,415 | Deakin | May 31, 1949 |